July 31, 1962  J. M. WOODLEY  3,046,689
BAIT HARNESS ASSEMBLY
Filed July 6, 1960

INVENTOR
JAMES M. WOODLEY

BY

ATTORNEY

UNITED STATES PATENT OFFICE 3,046,689
Patented July 31, 1962

3,046,689
BAIT HARNESS ASSEMBLY
James M. Woodley, Maplewood, La., assignor to Dido Lures, Inc., Houston, Tex., a corporation of Texas
Filed July 6, 1960, Ser. No. 41,188
1 Claim. (Cl. 43—42.24)

This invention relates to fishing lures and, more particularly, to a harness for attaching hooks and lures to an elongate delicate bait, such as a natural or artificial worm.

The primary object of the invention is to provide a hook and lure harness by means of which the hooks and lures may be attached to soft bait so as to create an effective array which may be cast or trolled while keeping the bait intact against breaking or tearing.

Another object is to provide a harness by which hooks, or hooks and an attractor, may be mounted alongside an elongate flexible bait and which, when trolled or retrieved through the water, will hold the points of the hooks upright in such manner as to protect the hooks against snagging or obstructions therebeneath.

These and other objects will be apparent from the following specification and drawing, in which.

Figure 1:
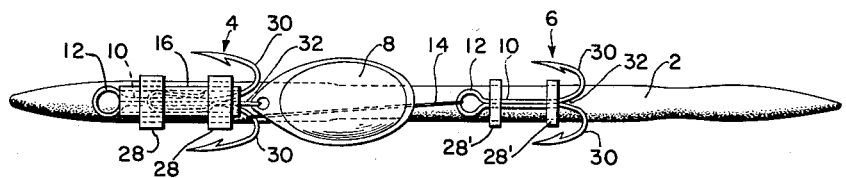
FIG. 1 is a bottom view of the harness assembly on an artificial worm.

Referring now to the drawing, in which like numerals denote similar elements, the assembly includes an artificial worm 2 consisting of an elongate body of soft and flexible rubber or plastic, closely simulating a natural worm as to color and shape. The invention, which may also be applied to a natural worm with nearly equal facility, consists of a pair of conventional two-gang hooks 4 and 6 and an attractor 8. Each hook includes a double shank 10 terminating in an eye 12, the hooks being connected in tandem by a leader 14 tied to a bend 30 of one of the front hooks 4 and secured through the eye 12 of the rearmost hook 6. Attractor 8 is secured to the shank of double hook 4 by means of a mounting which is the subject matter of my co-pending application Serial Number 41,187 entitled Attractor Mounting for Fishhooks filed concurrently herewith, and which includes a flexible plastic sleeve 16 which slips over hook shank 10. A bent wire connector 18 has an open U-bend 20 at one end, the bent wire beyond the U-bend terminating in an outwardly projecting free end 22, with the opposite end of the bent wire terminating in a closed loop 24 which passes through an eye 26 in attractor 8. The free leg of U-bend 20 tends to spring away from the other leg so that when the U-bend 20 is inserted into plastic sleeve 16, free end 22 snags into the inner side of sleeve 16, thereby preventing the bent wire 18 and attractor 8 from being pulled rearwardly from sleeve 16.

Figure 2:
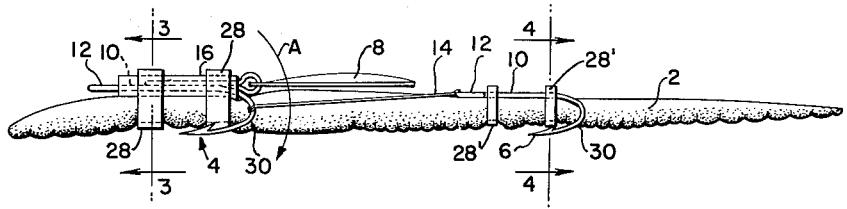
FIG. 2 is a side elevation of the FIG. 1 assembly in inverted position.
Figure 3:
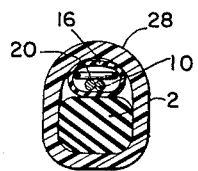
FIG. 3 is a vertical cross-section along the line 3—3 of FIG. 2.
Figure 4:
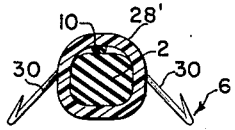
FIG. 4 is a cross-section along the line 4—4 of FIG. 2.
Figure 5:
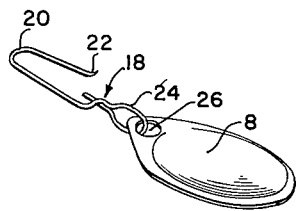
FIG. 5 is a perspective view showing the details of the attractor mounting.

Pairs of plastic rings 28 and 28' engage around worm 2 so as to hold plastic sleeve 16 and shank 10 of hook 6 closely against the body of the worm. Rings 28 and 28' are of such diameter as to hold the plastic sleeve 16 and rear hook shank 12 firmly in place without unduly compressing the worm body, but with sufficient compression to prevent the worm body from slipping out, be it artificial or alive. It should be noted that the shanks 10 of both the hooks and also attractor 8 are mounted on one side of the worm body, and that the bends 30 of the hooks pass around each side of the worm. Thus, if the assembly lands in the water positioned as in FIG. 2, the greater total weight of attractor 8, hook shanks 12, sleeve 16 and wire 18, all on one side of the body of worm 2, will cause the entire assembly, including the worm body, to invert as indicated by the curved arrow A, so that the pointed ends of the hooks are disposed upwardly. The worm body then fits in the crotches 32 between divergent hook bends 30, and the then under side of the assembly, shown in FIG. 1, will ride over obstructions beneath, thereby decreasing the liability that the bait will snag obstructions on or near the bottom.

The invention is not limited to the details disclosed and described herein, but is intended to cover all substitutions, modifications and equivalents within the scope of the following claim.

I claim:

In a lure, the combination of a bait harness for securing a relatively soft and pliable worm body to a double hook having elongate shank means and a pair of hook bends diverging therefrom and forming a crotch therebetween, comprising a plastic ring encircling and engaging around the hook shank means and the worm body, the diameter of the plastic ring being slightly less than the combined normal straight-line distance diametrically through the body and hook shank means, and having an axial length which is a small fraction of the length of the hook shank means whereby to constrict said worm body and compress the same tightly against said hook shank means, said worm body nesting in said crotch, an attractor blade having an eye at one end thereof, a blade support including a wire having an elongate body portion and a closed loop at one end thereof, said loop freely engaging through said eye with substantially universal swinging movement, and means including said plastic ring for mounting the body portion of said blade support alongside the hook shank means, said loop being disposed in the crotch between the diverging hook bends, whereby reactive forces resulting from the swinging of said blade cause said worm to wiggle.

References Cited in the file of this patent
UNITED STATES PATENTS

| | | |
|---|---|---|
| 622,206 | Claflin | Apr. 4, 1899 |
| 1,250,473 | Ladd | Dec. 18, 1917 |
| 1,831,870 | McIntosh | Nov. 17, 1931 |
| 2,605,579 | Chadwick | Aug. 5, 1952 |
| 2,616,207 | Shadley et al. | Nov. 4, 1952 |
| 2,686,381 | Peterson | Aug. 17, 1954 |
| 2,736,123 | Peterson | Feb. 28, 1956 |
| 2,792,662 | Norton | May 21, 1957 |
| 2,979,850 | Lund | Apr. 18, 1961 |